US010604642B2

(12) United States Patent
Yrieix et al.

(10) Patent No.: US 10,604,642 B2
(45) Date of Patent: Mar. 31, 2020

(54) AEROGEL-BASED MATERIAL THAT IS SUPER-INSULATING AT ATMOSPHERIC PRESSURE

(75) Inventors: Bernard Yrieix, Moret sur Loing (FR); Benoit Morel, Buthiers (FR); Genevieve Foray, Seyssuel (FR); Agnes Bogner, Lyons (FR); Bertrand van de Moortele, Lyons (FR)

(73) Assignee: Electricite de France, Paris (FR)

( * ) Notice: Subject to any disclaimer, the term of this patent is extended or adjusted under 35 U.S.C. 154(b) by 394 days.

(21) Appl. No.: 14/119,047

(22) PCT Filed: May 25, 2012

(86) PCT No.: PCT/FR2012/051179
§ 371 (c)(1),
(2), (4) Date: Aug. 14, 2014

(87) PCT Pub. No.: WO2012/168617
PCT Pub. Date: Dec. 13, 2012

(65) Prior Publication Data
US 2014/0361209 A1 Dec. 11, 2014

(30) Foreign Application Priority Data

May 26, 2011 (FR) ...................... 11 54593

(51) Int. Cl.
C04B 14/06 (2006.01)
C04B 20/00 (2006.01)
C04B 26/02 (2006.01)
E04B 1/62 (2006.01)
E04C 2/284 (2006.01)
C08K 7/26 (2006.01)
C04B 111/00 (2006.01)
C04B 111/10 (2006.01)

(52) U.S. Cl.
CPC .............. C08K 7/26 (2013.01); C04B 14/064 (2013.01); C04B 26/02 (2013.01); E04B 1/62 (2013.01); E04C 2/284 (2013.01); C04B 2111/00482 (2013.01); C04B 2111/10 (2013.01)

(58) Field of Classification Search
CPC ............ C04B 20/0096; C04B 20/1051; C04B 14/064; C04B 26/02; C04B 2103/40; C04B 2111/00482; C04B 2111/10; C08K 7/26; E04C 2/284; E04B 1/62
USPC ............................................. 252/62; 52/309.1
See application file for complete search history.

(56) References Cited

U.S. PATENT DOCUMENTS 2,811,457 A * 10/1957 Speil ........................ C04B 30/02
252/62
5,569,513 A * 10/1996 Fidler .................... C08J 9/0066
428/304.4
5,656,195 A * 8/1997 Mielke ................... C04B 14/064
106/38.3
7,468,205 B2 * 12/2008 Schwertfeger .......... B32B 27/18
428/220
2005/0025952 A1 2/2005 Field
2006/0196690 A1 * 9/2006 Ristic-Lehmann ........................ A41D 19/01529
174/255
2009/0272078 A1 * 11/2009 Pfeffer ...................... B01F 3/18
53/437
2010/0075431 A1 3/2010 Zhou
2012/0128958 A1 * 5/2012 Zeng ................... C01B 33/1585
428/219

FOREIGN PATENT DOCUMENTS

| DE | 4441567 | 11/1994 |
|---|---|---|
| DE | 19533564 | 3/1997 |
| DE | 19702239 | 7/1998 |
| EP | 0340707 | 8/1992 |
| EP | 0787112 | 1/1998 |
| EP | 0954438 | 10/2001 |

(Continued)

OTHER PUBLICATIONS

Guggenheim et al., "Definition of Clay and Clay Mineral: Joint Report of the AIPEA Nomenclature and CMS Nomenclature Committees", 1995, Clays and Clay Minerals, vol. 43, No. 2, pp. 255-256.*

(Continued)

Primary Examiner — Matthew E. Hoban
Assistant Examiner — Lynne Edmondson
(74) Attorney, Agent, or Firm — McAndrews, Held & Malloy, Ltd.

(57) ABSTRACT

The present invention relates to a solid thermally insulating material, essentially free of phyllosilicates, comprising (a) from 70 to 98% by volume of hydrophobic silica aerogel particles having an intrinsic density between 110 and 210 kg/m, (b) from 0.3 to 12% by volume of an organic binder formed by at least one organic polymer (b1) and at least one surfactant (b2), or by an amphiphilic organic polymer (b3), these volume fractions being determined by image analysis on thin sections of the solid material and being given relative to the total volume of the material, the aerogel particles having a particle size distribution that has at least two maxima, with a first maximum corresponding to an equivalent diameter (d) of less than 200 μm, preferably between 25 μm and 150 μm, and a second maximum corresponding to an equivalent diameter (D) between 400 μm and 10 mm, preferably between 500 μm and 5 mm. It also relates to a thermally insulating product containing at least one layer of this material.

15 Claims, No Drawings

(56) References Cited

FOREIGN PATENT DOCUMENTS

| JP | 10147664 A | 6/1998 | | |
|----|----|----|----|----|
| JP | 63-201565 | 8/1998 | | |
| JP | 11-513349 A | 11/1999 | | |
| JP | 2001011360 A | 1/2001 | | |
| JP | 2001-343379 | 12/2001 | | |
| JP | 2002-250713 | 9/2002 | | |
| JP | 2004-170339 | 6/2004 | | |
| JP | 2006-501625 | 1/2006 | | |
| JP | 2008-082840 | 4/2008 | | |
| JP | 2009-513977 | 4/2009 | | |
| WO | WO 9832709 A1 | * | 7/1998 | ............... B32B 7/18 |
| WO | 2003/064025 | 1/2003 | | |
| WO | 2004/037533 | 5/2004 | | |
| WO | 2007/050463 A1 | 5/2007 | | |

OTHER PUBLICATIONS

Huiju et al., "Mixing and Packing of Fine Particles of Different Sizes," Industrial & Engineering Chemistry, 50 (1):198-206 (2011).
Huija Liu, Mixing and Packing of Fine Particles of Different Sizes, Industrial & Engineering Chemistry Research, U.S., American Chemical Society, Jan. 5, 2011, vol. 50, No. 1, p. 198-206.

\* cited by examiner

AEROGEL-BASED MATERIAL THAT IS SUPER-INSULATING AT ATMOSPHERIC PRESSURE

The present application is filed pursuant to 35 U.S.C. 371 as a U.S. National Phase application of International Patent Application No. PCT/FR2012/051179, which was filed May 25, 2012, claiming the benefit of priority to French Patent Application No. 1154593, which was filed on May 26, 2011. The entire text of the aforementioned applications is incorporated herein by reference in its entirety.

The present invention relates to a hydrophobic aerogel and organic binder-based solid material and to the use of such a material, preferably incorporated in a panel, for thermal insulation, in particular the thermal insulation of buildings.

The construction sector, which consumes more than 40% of the final energy and contributes close to a quarter of greenhouse gas emissions of France, represents the main area where energy savings can be immediately made. The number of dwellings constructed before the first oil shock and in particular before the first regulation targeted at thermal insulation of new buildings (1975) is still considerable and thermal insulation of existing buildings consequently constitutes a key field where it is relatively easy to achieve considerable savings in energy.

One of the explored routes is internal thermal insulation, that is to say insulation by covering surfaces (walls, ceilings, floors, roofing) with materials having a low thermal conductivity. Resistance to this approach is probably mainly due to the reduction in habitable space resulting from affixing of thick panels to the walls much more than to the cost and the work which such a renovation would involve. The thickness of these panels, necessary to obtain a given insulating result, of course decreases in proportion as their insulating power increases.

The development of thermally insulating materials having a very low thermal conductivity ($\lambda$) is thus a field of research in which the applicant has been very active for many years. It has thus provided vacuum insulating panels which are very efficient ($\lambda$=5 to 10 mW/(m·K)) but also very fragile (HiPTI—High Performance Thermal Insulation, IEA/ECBS Annex 39 "Vacuum Insulation Panels—Study on VIP-components and Panels for Service Life Prediction of VIP in Building Applications (Subtack A)", September 2005).

The present invention is the result of another research route relating to materials which are super-insulating at atmospheric pressure (SIAP).

A super-insulating material for the thermal insulation of existing buildings ideally:
- is based on materials available in large amounts,
- exhibits a relatively moderate production cost in comparison with the energy savings which it makes it possible to achieve,
- has a mechanical strength which allows it to be transported, handled and installed under conditions normal for materials of this type and, of course,
- exhibits a thermal conductivity which is as low as possible.

Aerogels and in particular silica aerogels are materials known for their very low thermal conductivity. The intrinsic thermal conductivity of a silica aerogel (=conductivity of a monolith for this aerogel) is, depending on the porosity, of the order of 10 to 15 mW/(m·K). However, the very high mechanical fragility and the exorbitant cost of aerogel monoliths prohibit them from being used for the thermal insulation of buildings.

A great number of patent applications have considered the use of aerogel particles, bonded to one another with organic binders (polymers) or inorganic binders (hydraulic binders), for manufacturing insulating panels.

Application EP 0 340 707 discloses thermally insulating materials based on hydrophobic aerogel beads having a diameter of between 0.5 and 5 mm, a density of 0.05 to 0.35 g/cm$^3$ and a bulk density, or apparent density, of between 0.04 and 0.25 g/cm$^3$. These beads are mixed with 5% to 50%, with respect to the total weight of the mixture, of an organic binder, for example a melamine-formaldehyde resin. The used binder advantageously fills the intergranular or interparticulate volume of the aerogel. The thermal conductivities of these materials are between 28 and 43 mW/(m·K).

Application EP 0 787 112 discloses a liquid composition comprising aerogel particles of small size (diameter of less than 500 µm, preferably less than 250 µm) in suspension in an aqueous binder of organic or inorganic nature. The very small size of the aerogel particles is an essential feature of the invention described in this application. The dried thermally insulating materials obtained from these compositions have thermal conductivities of between 35 and 46 mW/(m·K).

International application WO 03/064025 discloses thermally resistant composites comprising at least one hydrophobic aerogel particle and aqueous binder-based layer. The aerogel particles have a mean diameter of less than 5 mm, preferably between 0.1 and 3 mm. Their shape is preferably spherical and their particle size distribution relatively narrow. These particles are incorporated in an aqueous binder foam, the foam being created thanks to the presence of a foaming agent. The prepared thermally insulating materials have a thermal conductivity of approximately 32 mW/(m·K).

Application DE 4441567 discloses aerogel particle and organic binder-based insulating materials. The aerogel particles have an equivalent diameter of less than 0.5 mm, preferably of less than 0.2 mm. The content of aerogel particles in the final materials is described as being preferably between 20% and 90% by volume. The exemplified materials have relatively high thermal conductivities of between 150 and 250 mW/(m·K).

Application EP 0 954 438 describes multilayer composite materials comprising at least one aerogel particle-based layer. They are in particular materials having a sandwiched structure with an intermediate aerogel-based layer between two poly(ethylene terephthalate) fibre-based layers. The aerogel particles of the intermediate layer are described as having an equivalent diameter of between 250 µm and 10 mm, preferably between 250 µm and 2 mm. The example describes the manufacture of a three-layer material having a thermal conductivity of 45 mW/(m·K).

Finally, U.S. Pat. No. 5,656,195 discloses molded thermally insulating products which are silica aerogel-based and exhibit good thermal conductivities, of the order of 17 to 23 mW/(m·K), but at the cost of the use of phyllosilicates intended to adjust the viscosity of the selected binders. Indeed some phyllosilicates, due to their small size and their crystalline structure, might exhibit health risks for the personnel present on the manufacturing site but potentially also for the users of the finished materials (see *Health related effects of phyllosilicates*, by Jean Bignon, Springer Verlag, 1990). In addition, the use of phyllosilicates which is recommended by this document exhibits numerous drawbacks originating from the high specific surface of these materials and their affinity for water:

it results in high binder proportions, of the order of 13% to 32% by weight, capable of increasing the thermal conductivity of the final product, it mobilizes water and slows down drying, it has a tendency to reinforce mechanically the binder, what is necessary to prevent due to the high fragility of the aerogel particles, it renders the manufacturing process more complex and increases the cost thereof.

This brief nonexhaustive review shows that, despite the use of supposedly high amounts (up to 95% by volume) of aerogel particles having a low intrinsic thermal conductivity (11 mW/(m·K) in example 1 of EP 0954438), it appears impossible to obtain materials having thermal conductivities significantly lower than 25 mW/(m·K), or only at the price of the use of potentially harmful inorganic components.

The applicant, after many years of research targeted at providing aerogel particle-based thermally insulating materials, has understood that the volume proportion of the aerogel plays an essential role in the insulating power of the finished materials. By focusing all its efforts on the achievement of materials with truly high volume fractions of aerogel, it has been able to manufacture materials having thermal conductivities of less than 18 mW/(m·K), sometimes even reaching 14-15 mW/(m·K), this being achieved using only amorphous inorganic components (silica) and avoiding the use of crystalline inorganic compounds, such as phyllosilicates.

During its research studies, the applicant has understood in particular that it is essential to reduce as much as possible the interparticulate volume of the materials without, however, filling it with the binder, as the latter has a thermal conductivity which is generally much greater than that of the aerogel and would undesirably increase the overall thermal conductivity of the material.

The applicant has in addition found that, contrary to the teaching of U.S. Pat. No. 5,656,195, the presence of a certain fraction of phyllosilicates was in no way essential.

In the present invention, the reduction of interparticulate space volume is obtained:

via the use of at least two populations of aerogel particles which differ in their size, the fine particles filling the gaps left by the large particles, via the optimization of the proportions of mixture of these particles populations, via the limitation of the amount of binder, without excessive embrittlement of the material, made possible by the low interparticulate volume, and by virtue of the use of an appropriate amount of a surface-active agent or amphiphilic agent which, during the preparation of materials, ensures the interaction between the hydrophobic particles and the aqueous phase of the binder in which they are suspended; the use of surface-active agent thus results in a uniform and optimized spatial distribution of the particles.

A subject matter of the present invention is consequently a solid thermal insulation material, essentially devoid of phyllosilicates, comprising:

(a) 70% to 98% by volume, preferably 75% to 96% by volume, in particular 80% to 95% by volume, of hydrophobic silica aerogel particles having an intrinsic density of between 110 and 210 kg/m$^3$, (b) 0.3% to 12% by volume, preferably 0.5% to 9% by volume, of an organic binder formed by at least one organic polymer (b1) and at least one surface-active agent (b2), or by at least one amphiphilic organic polymer (b3), these volume fractions being determined by image analysis on thin sections of the solid material and being with respect to the total volume of the material, the aerogel particles having a particle size distribution exhibiting at least two maxima, with a first maximum corresponding to an equivalent diameter (d) of less than 200 μm, preferably of between 25 μm and 150 μm, and a second maximum corresponding to an equivalent diameter (D) of between 400 m and 10 mm, preferably between 500 μm and 5 mm.

In the present patent application, unless otherwise indicated, the particle size distributions are particle size distributions by volume.

The expression "essentially devoid of phyllosilicates" means that the material comprises less than 0.1% by weight, preferably less than 0.05% by weight and in particular less than 0.01% by weight of phyllosilicates. Indeed, the lower the fraction of these crystalline inorganic components, the more the risks for the environment and health which they exhibit are reduced.

In the present patent application, the equivalent diameter of a nonspherical particle is understood to mean the diameter of the sphere with the same volume as the particle. The mean equivalent diameter is the mean value by volume of the equivalent diameters of a population of particles. For particles having a size of less than 2 mm, this mean equivalent diameter can be experimentally determined by laser particle size determination. For sizes above 2 mm, it is possible to estimate this diameter by sieving with narrow intervals between sieves. Mention may also be made, as measurement method, of image analysis and more particularly the methods of intercepts or openings by successive steps, particle size functions provided in the majority of commercial analyzers.

The sum of constituents (a) and (b) preferably represents at least 90% by weight, in particular at least 92% by weight, more preferably still at least 95% by weight, of the material.

Indeed the material can comprise small proportions of other ingredients, such as fibers or opacifying particles, described in more detail hereafter. Furthermore, the interparticulate space is also inevitably composed of a certain fraction of air.

In principle, any hydrophobic aerogel commonly used in the art for thermal insulation applications can be used as aerogel, for example aerogels carrying organic groups described in the documents discussed above.

Wording "aerogel" denotes, in the present invention, gels of metal oxides obtained in a known way by the sol-gel route, which have been dried. This wording encompasses both aerogels proper, obtained by supercritical drying of the formed gels, but also gels commonly called "xerogels" obtained by evaporative drying at atmospheric pressure. Xerogels, due to their low cost, are very advantageous when large scale production of the materials of the present invention is considered, while aerogels exhibit more advantageous technical properties but have a high production cost.

The organic groups conferring on the aerogel its hydrophobic nature are preferably groups of formula —Si(R)$_n$, where n=1, 2 or 3 and R represents a nonhydrolysable, linear, branched or cyclic, aromatic or cycloaliphatic organic group, preferably a $C_{1-18}$ alkyl or $C_{6-14}$ aryl group; cyclohexyl, phenyl or $C_{1-6}$ alkyl, in particular methyl or ethyl, groups being particularly preferred.

It is known that the thermal conductivity of an aerogel decreases with its density, at least as far as an optimum established between 90 and 160 kg·m$^{-3}$. Use will thus preferably be made, in the present invention, of an aerogel having a density of less than 0.3 g/cm$^3$ and preferably of between 0.1 and 0.25 g/cm$^3$, in particular of between 0.11 and 0.21 g/cm³, these values corresponding to the aerogel intrinsic density, that is to say to the density of a monolith of this aerogel.

The aerogel intrinsic density ($\rho_i$) is, of course, greater than the bulk density or apparent density ($\rho_{app}$) of a powder of the same aerogel, which is reduced as a result of the interparticulate interstices.

Indeed, for an aerogel monolith, equivalent to a single large-size aerogel particle, the intrinsic density ($\rho_i$) is calculated in the following way:

$$\rho_i = m_{particle}/V_{particle}$$

where $m_{particle}$ is the weight of an aerogel particle and $V_{particle}$ is the volume occupied by the same particle.

Experimentally, this intrinsic density can be determined, in a known way, by X-ray tomography coupled to a measurement of apparent density or else by low pressure Hg picnometry.

For a powder, formed of several aerogel particles, the apparent density ($\rho_{app}$) is equal to $$\rho_{app} = m_{particle}/(V_{particle} + V_{inter}) = m_{particles}/V_{total}$$

The apparent density of a powder tends to that of the monolith when the interparticulate volume ($V_{inter}$) tends to zero.

As explained in the introduction, the present invention is based on the discovery that, by reducing as much as possible the interparticulate volume ($V_{inter}$) of the used aerogel powder, in other words by maximizing its compactness ($C_{powder}$), success is achieved in preparing thermally insulating materials having a low content of binder and having a low interparticulate volume, exhibiting thermal conductivities hitherto unknown for materials based on aerogel particles and on organic binder.

The applicant has developed a relatively simple way of optimizing the compactness ($C_{powder}$) of the used aerogel powder. Compactness is understood here to mean the volume occupied by the particles, with respect to the total volume of the powder, the total volume of the powder being the sum of the volume of the particles ($V_{particle}$) and of the interparticulate volume ($V_{inter}$).

$$C_{powder} = V_{particle}/V_{total}$$

with $$V_{total} = V_{particle} + V_{inter}$$

When two different populations of particles (bimodal particle size distribution) are used, the first having a mean equivalent diameter ($D_m$) and the second having a mean equivalent diameter ($d_m$), different mixtures comprising variable proportions of these two powders are prepared and the apparent density or bulk density of each of the mixtures is measured.

A diagram is subsequently plotted showing the measured density of the mixtures as a function of the respective proportions of each of the powders. FIG. 1a thus shows the density of a mixture of two aerogels having different particle sizes, as a function of the fraction by weight of one of the two aerogels, the complementary part to 100% being formed of the other.

FIG. 1(b) was obtained by calculating the compactness of the powders according to the following formula:

$$C_{powder} = \frac{\rho_{app}}{\sum_{j=1}^{n}(v_j \cdot (\rho_i)_j)}$$

-continued $$\sum_{j=1}^{n} v_j = 1$$

where $v_j$ denotes the volume fraction of the aerogel j of intrinsic density $(\rho_i)_j$.

It is easily possible, in FIG. 1(b), to find the proportions of mixture resulting in the greatest bulk compactness of the mixture. For the example of FIG. 1(b) obtained with a first aerogel powder A having a mean equivalent diameter $d_m$ of 33.5 μm and a second aerogel powder B having an equivalent diameter $D_m$ of 1210 μm (see example 1), it concerns mixtures comprising from approximately 40% to 70% by weight, preferably from 40% to 60% by weight, of powder B.

These optimum respective proportions depend, of course, on a certain number of parameters, such as the $D_m/d_m$ ratio, the width of the distributions of each of the powders, the shape of the particles making up the powders, and the like, and are ideally determined for each combination of aerogel powders.

Of course, this method can also be applied to a mixture of three or more than three populations of particles.

The compactness of the bulk aerogel mixture before embellishment and that obtained within the final material are not necessarily identical. This is because the mixing with the other constituents and the process employed can modify the arrangement and the particle size distribution of the particles. Thus, a readjustment in the proportions of the various aerogel powders may prove to be necessary according to the process for producing the final material in order to obtain the desired compactness.

The aerogel having a bimodal or multimodal distribution used in the production of the materials of the present invention preferably has a bulk density, before mixing with the other ingredients, of between 0.080 and 0.180 g/cm³, preferably between 0.095 and 0.150 g/cm³. This compactness as defined above is preferably greater than 0.75, in particular greater than 0.77 and ideally greater than 0.78.

The ratio of the equivalent diameter (D), corresponding to the particle size maximum lying between 400 μm and 10 mm, to the equivalent diameter (d), corresponding to the particle size maximum lying below 200 μm, is preferably between 10 and 200, in particular between 20 and 100.

In the present invention, the small-sized aerogel particles fill the interparticulate spaces left free by the particles of larger size (see FIG. 5).

In a preferred embodiment, the volume fraction of aerogel particles having an equivalent diameter of less than 200 μm is between 7.5% and 60%, preferably between 20% and 55%, these percentages being with respect to the combined aerogel particles.

In another preferred embodiment, the volume fraction of aerogel particles having an equivalent diameter of less than 150 μm is between 7.5% and 60%, preferably between 20% and 55%, these percentages being with respect to the combined aerogel particles.

In yet another preferred embodiment, the volume fraction of aerogel particles having an equivalent diameter of less than 80 μm is between 7.5% and 60%, preferably between 20% and 55%, these percentages being with respect to the combined aerogel particles.

In the insulating materials of the present invention, the aerogel particles are used in combination with a polymeric organic binder (component b) which gives the material its cohesion and mechanical strength.

This binder can be a mixture of an organic polymer (organic b1) and of a surface-active agent (component b2). Indeed, for the purpose of avoiding the use of volatile organic compounds, the mixing of the aerogel particles with the organic binder is preferably carried out in an aqueous medium. In the absence of an amphiphilic agent, it would then be impossible to disperse the hydrophobic aerogel homogenously into the liquid phase.

Out of the 0.3% to 12% by volume of organic binder (b), approximately 0.2% to 8%, preferably 0.4% to 6% and in particular from 0.5% to 2%, with respect to the total volume of the material, are formed by the organic polymer (b1) and approximately 0.1% to 4% by volume, preferably from 0.1% to 3% by volume and in particular from 0.15% to 1% by volume, with respect to the total volume of the material, are formed by the surface-active agent (b2).

The polymer (b) is preferably dissolved or dispersed beforehand in water and the aerogel particles are subsequently incorporated into this solution or dispersion. Given that the use of organic solvents or cosolvents is undesirable, the choice will preferably be made of water-soluble or water-dispersible thermoplastic organic polymers. The term "water-dispersible polymers" is understood to mean, according to the present invention, polymers which, when they are dispersed in water, take the form of particles having a mean size of between 10 and 300 nm and preferably between 10 and 100 nm.

The concentration of the water-soluble or water-dispersible polymer in the aqueous phase is preferably fairly low, this low concentration making it possible to limit the amount of binder incorporated in the material and facilitating the uniform distribution of the polymeric binder over the aerogel particles. Preferably, the aqueous phase (also including the surface-active agent but not the aerogel particles) comprises at most 20% by weight of polymeric organic binder, in particular between 1% and 10% by weight of organic binder and more preferably still between 1.5% and 8% by weight of organic binder.

In a particularly advantageous embodiment, the organic polymer is a thixotropic water-soluble polymer capable of forming a physical gel by the establishment of a multitude of weak bonds (for example hydrogen bonds) but having a viscosity which rapidly decreases when it is subjected to shear forces. Such a polymer is particularly advantageous as it gives the aerogel/aqueous phase mixture a pasty consistency which facilitates some methods for shaping the material before drying. The very high viscosity at rest of the thixotropic polymer gels furthermore prevents possible sedimentation/segregation of a portion of the aerogel particles, thus guaranteeing a uniform distribution of the aerogel particles throughout the material.

As explained above, the surface-active agent is essential in order to make it possible to wet the hydrophobic surface of the aerogel particles by the aqueous phase and to ensure a dispersion which is as uniform as possible. The surface-active agent can be introduced into the aqueous phase before or after the organic polymer or can also be applied to the aerogel particles before incorporation of the latter into the aqueous binder solution or suspension. Its concentration in the aqueous phase is generally between 0.3% and 3% by weight.

The organic polymer can also be a thermosetting resin which polymerizes and/or crosslinks after the aerogel/liquid phase mixture is shaped. It can be, for example, polyester, polyurethane, vinyl ester, aminoplast, phenolic or epoxy resins.

Mention may be made, as examples of the thermoplastic polymers, of modified water-soluble or water-dispersible celluloses and starches, such as cellulose or starch ethers, acrylic polymers, silicones, poly(vinyl acetate)s, ethylene/vinyl acetate copolymers, styrene/acrylate copolymers, vinyl/acrylate copolymers, styrene/butadiene copolymers, poly(vinyl alcohol), polyacrylamides or poly(vinyl chloride).

The applicant has successfully used:
cellulose ethers sold by Bostik under the name Quelyd Vinyl+® and by SE Tylose® under reference Tylose HA40YP2,
styrene/butadiene and styrene/butyl acrylate latexes respectively provided by Sika under the name Sikalatex® and BASF under the name Model Dispersion,
a two-component epoxy resin sold by BASF under references Mastertop 1720 A7 and B7.

The choice will preferably be made, among surface-active agents, of nonionic surface-active agents exhibiting a low foaming power. Mention may be made, by way of examples, of the surface-active agents of the series of the Triton® X sold by Dow, in particular Triton X-100 (polyethoxylated nonylphenol), Flip-Flop® (copolymer of styrene and of methacrylic esters in aqueous solution), sold by PCAS, or Tylovis® EP28 sold by SE Tylose (copolymer of propylene oxide and ethylene oxide).

It is possible to partially or completely replace the organic polymer and the surface-active agent with a component exhibiting the properties and functionalities of both components. Thus, use may be made, in place of or in addition to the components (b1) and (b2), of one or more amphiphilic polymers (component b3).

They are known organic polymers which comprise both hydrophilic sequences or groups and hydrophobic sequences or groups, for example polymers synthesized from intrinsically amphiphilic monomers, for example comprising an ionic group and a fatty chain.

The insulating material of the present invention can additionally comprise at most 2% by volume, preferably 0.2% to 1% by volume, of particles which are opacifying under infrared radiation. Such particles are known and are chosen, for example, from particles of carbon black, graphite, titanium dioxide, iron oxide or zirconium dioxide, silicon carbide, silicates and complex aluminates. These particles can be present besides the aerogel particles, that is to say in the interparticulate space, or else they can be incorporated in the core of the aerogel particles during the synthesis of the latter by the sol-gel route.

In addition, the material according to the invention can comprise a certain fraction of reinforcing fibers. They can be inorganic fibers, for example glass, carbon, alumina, ceramic or rock fibers, or else organic fibers, for example cellulose, cotton, wool, polyamide, polyester, polyethylene or polypropylene fibers or fibers of recycled composite materials. Given that all these fibers have a thermal conductivity greater than that of the aerogel, an attempt will be made to limit their proportion to the minimum amount resulting in the desired mechanical strength. Generally, the material according to the invention comprises at most 5% by volume, preferably 0.1% to 4% by volume, in particular 0.5% to 3% by volume, of organic and/or inorganic fibers.

The originality of the material of the present invention does not, however, lie so much in the chemical nature of the ingredients (polymer binder, surface-active agent, opacifying particles, reinforcing fibers) as in the specific particle size of the aerogel used. Indeed, as already explained above, the applicant company has discovered that it is possible to prepare thermally insulating materials having a very low thermal conductivity by using, in combination, both an aerogel composed of particles having a coarse size and an aerogel composed of particles which are much finer and intended to fill the interparticulate volume of the large particles.

In order for the fine aerogel particles to be able to efficiently fill in the interparticulate volume between the large particles, their equivalent diameter is preferably significantly lower than that of the large particles. This difference in size between the small and large aerogel particles might be quantified through of the ratio of the mean equivalent diameter of coarse particles of the sample to the mean equivalent diameter of fine particles of this same sample.

In the finished material, however, the notion of mean equivalent diameter is not very relevant as it is impossible to reconstruct, from the particle size distribution of the mixture, the two or several populations of particles used. The applicant company consequently decided to characterize the difference in size between the different populations of particles used, in the finished material, through of the ratio of the equivalent diameter (D) corresponding to the most intense maximum in the range 0.4 to 10 mm to the equivalent diameter (d) corresponding to the most intense maximum in the range of less than 200 µm. This ratio D/d is preferably between 10 and 200, in particular between 20 and 100 and particularly advantageously between 25 and 80. The values (d and D) of the diameters corresponding to these maxima are determined by image analysis on sections.

These preferred ranges remain valid even when the particle size distribution comprises more than two maxima, that is to say when the aerogel has been prepared by mixing three, four or more populations of particles having different particle sizes.

The material of the present invention inevitably comprises a certain volume fraction of air in the form of macropores (diameter greater than 200 nm).

In order to limit as much as possible the thermal conduction by gas conduction, an attempt will be made to remove or at least to greatly restrict the volume fraction occupied by macropores. This can be done while taking care not to use a foaming surface-active agent, by avoiding stirring and preparation methods which favor foaming, air entrainment or air injection, or else by using an antifoaming agent.

The binder of the material according to the invention does not form a continuous matrix. It does not fill all the space between the aerogel particles. Such a configuration would result in a material exhibiting an excessively high thermal conductivity. On the contrary, the binder of the material according to the invention forms very thin films and/or occasional bridges or fibrils between at least a portion of the particles.

According to a particularly preferred embodiment of the invention, the material comprises a binder having a glass transition temperature of less than 30° C. and which is provided in the form of a film on the aerogel particles with a mean thickness of less than 0.4 microns and/or of fibrils between the aerogel particles with a mean thickness of less than 1 micron.

Another subject matter of the present invention is a process for the preparation of a thermal insulating material as described above. Such a process comprises at least three steps, namely:

mixing the hydrophobic silica aerogel particles (a), the surface-active agent (b2) and the organic polymer (b1) or the amphiphilic polymer (b3) with, or bringing them into contact with, 0.75 to 4 parts by weight of water, preferably with 1.5 to 3 parts by weight of water, for one part of solid components (a, b1, b2, b3), shaping the aqueous composition thus obtained, and drying the shaped material.

The component (a), namely the hydrophobic silica aerogel, is advantageously obtained by mixing at least two aerogel fractions, a first fraction exhibiting a mean equivalent diameter ($d_m$) of less than 200° µm, preferably of between 25° µm and 150° µm, and a second fraction exhibiting a mean equivalent diameter ($D_m$) of between 400° µm and 10° mm, preferably between 500° µm and 5° mm. These different fractions can be obtained in a known way, for example by grinding a hydrophobic silica aerogel, followed by preparative sieving.

It is, of course, possible to mix two aerogel fractions obtained from two different aerogel samples having different intrinsic densities.

As explained above, the hydrophobic silica aerogel (a), before being mixed or brought into contact with the other ingredients, has the highest possible compactness. It is preferably greater than 0.75, in particular greater than 0.77, more particularly still greater than 0.78 and ideally greater than 0.80. This does not mean that the two aerogel fractions having different mean equivalent diameters have to be mixed with one another before being brought into contact with the water or with the other components of the material. This is because the present invention also encompasses the alternative form where the different aerogel fractions are mixed separately and successively with the other ingredients.

The mode of mixing the different components is not in principle determining for the present invention and a person skilled in the art is in a position to devise or test different protocols which make it possible to obtain a homogeneous mixture, comprising water and all of the solid components. This mixture can have a liquid consistency which is more or less viscous, for example making possible molding by casting, or else it can have the consistency of a paste.

In a preferred embodiment of the method of the invention, the organic polymer (b1) and the surface-active agent (b2) or the amphiphilic organic polymer (b3) are first dissolved or dispersed in the water and the solution or dispersion thus prepared is subsequently mixed or brought into contact with the aerogel particles, optionally mixed with reinforcing fibers and/or with the opacifying particles.

When an organic polymer (b1) and a surface-active agent (b2) are used in combination, the ratio by weight (b1)/(b2) is preferably between 30/70 and 80/20, in particular between 40/60 and 70/30.

The shaping of the aqueous composition thus obtained can be carried out, for example, by casting, extrusion, wringing or pressure molding. The drying of the shaped wet material is carried out by evaporation of the aqueous phase, with or without heating. It has proved to be advantageous to apply a moderate mechanical pressure, of the order of 0.5 to 20 kPa, to the material in the course of drying so as to expel possible formed air bubbles or to reduce the amount of air left in the interparticulate space subsequent to the evaporation of the water.

The material of the present invention, prepared from aerogel particles having an intrinsic density of between 110 and 210 kg/m³, preferably has a density, determined in the dry state, of between 100 and 215 kg/m³.

Its thermal conductivity at 23° C. (determined by flow measurement in accordance with standards ISO 8301, EN12667:2001 and EN1946-3:1999 on a Hesto Lambda Control K202 device on a sample placed under a pressure of 7 kPa) is less than 20 mW/(m·K), preferably less than 18 mW/(m·K), in particular between 14 and 17 mW/(m·K). This value increases with the amount of organic phase (b) and also with the amount of air included in the form of macropores.

Finally, another object of the present invention is a thermal insulation product comprising at least one layer of the material of the present invention.

This product is preferably a plate having a thickness of between 5 and 75 mm, in particular between 20 mm and 50 mm. It can comprise a number of other layers formed, for example, by metal or plastic sheets, paper sheets, cushions of natural or synthetic fibers, plates, grids, and the like.

In such a product, the aerogel-based thermal insulating material preferably represents at least 50% by volume, in particular at least 70% by volume and particularly advantageously at least 80% by volume, or even at least 95% by volume.

EXAMPLE 1

Two hydrophobic silica aerogels, sold under the Isogel® name by PCAS/Enersens, with particle sizes, established by sieving, of between 0 and 100 μm (Aerogel A, $\rho_i$=150 kg/m$^3$, $d_m$=33.5 μm, determined by dry-route laser particle size analysis) for the first and of between 1000 and 1250 μm (Aerogel B, $\rho_i$=182 kg/m$^3$, $D_m$=1210 μm, determined by dry-route laser particle size analysis) for the second, are mixed.

These aerogels are mixed in different volume proportions and the apparent densities of these mixtures are determined. FIG. 1a thus shows the densities of the mixtures as a function of the fraction by weight of Aerogel B, the complementary part to 100% being formed by Aerogel A.

A mixture of aerogel powders comprising:
 40% by weight of particles having a size of less than 100 μm (Aerogel A), and
 60% by weight of particles having a size of between 1000 and 1250 μm (Aerogel B),
has an apparent density ($\rho_{app}$) of 0.133 g/cm$^3$, a compactness of 0.79 (see FIG. 1b) and a thermal conductivity of 16 mW/(m·K) at 23° C.

A volume of this mixture is subsequently mixed with 0.285 volume of a preparation of Bostik adhesive comprising 2.2% by weight of cellulose adhesive sold under the Quelid Vinyl+® brand and 4.2% by weight of a 30% aqueous dispersion of nonionic surfactant sold under the Flip-Flop® reference by PCAS.

The homogeneous composition obtained has the consistency of a paste, which is spread to a thickness of 1 cm in a perforated mold, at the bottom of which has been placed a paper sheet impregnated with the wallpaper adhesive to which a surface-active agent has been added (see FIG. 2). A second impregnated sheet is used to cover the paste. This sandwiched structure is allowed to dry, at a temperature of 25° C. and at a relative humidity of 50%, for six days. A product is thus obtained in the form of a self-supporting plate which is easy to handle and to cut up, presented in FIGS. 3 and 4. FIG. 5 shows the microstructure, obtained by X-ray tomography, of the product thus obtained with a magnification of approximately 80.

The conductivity of the layer comprising the aerogel is only 17.0 mW/(m·K) at 23° C., that is to say scarcely greater than that of the powder mixture used for its preparation. This value is spectacularly low in comparison with the thermal conductivities reported in the prior art for insulating products based on bonded aerogel particles devoid of phyllosilicates, of between 25 and 350 mW/(m·K).

EXAMPLE 2

Two hydrophobic silica aerogels sold under the Isogel® name by PCAS/Enersens, with particle sizes, established by sieving, of between 0 and 100 μm for the first and of between 1000 and 1250 μm for the second, are mixed.

A mixture of aerogel powders comprising:
 40% by weight of particles having a size of less than 100 μm, and
 60% by weight of particles having a size of between 1000 and 1250 μm,
has an apparent density ($\rho_{app}$) of 0.136 g/cm$^3$, a compactness of 0.80 and a thermal conductivity of 15.8 mW/(m·K) at 23° C.

A volume of this mixture is subsequently mixed with 0.22 volume of an aqueous preparation comprising 15% by weight of a styrene/butadiene latex dispersion diluted to 47% in water and sold under the Sikalatex® brand and comprising 6.2% by weight of a 30% aqueous dispersion of nonionic surfactant sold under the Flip-Flop® reference by PCAS. The homogeneous composition obtained has the consistency of a paste, which is spread to a thickness of 1 cm in a perforated mold, at the bottom of which has been placed a paper sheet impregnated with the aqueous preparation. A second impregnated sheet is used to cover the paste. Drying is allowed to take place under a pressure of 0.9 kPa, at a temperature of 40° C. and at a relative humidity of 10%, for 20 h. The paper sheets are withdrawn and a product is thus obtained in the form of a self-supporting plate which is easy to handle and to cut up.

Its conductivity is only 16 mW/(m·K) at 23° C. This value is spectacularly low in comparison with the thermal conductivities reported in the prior art for insulating products based on bonded aerogel particles devoid of phyllosilicates, of between 25 and 350 mW/(m·K).

EXAMPLE 3

Opacified hydrophobic silica aerogel, sold under the Isogel® name by PCAS/Enersens, is ground and then subjected to fractionation by sieving.

The fraction of particles passing through a 100 μm sieve and the fraction obtained between 1000 μm and 1250 μm are used.

A mixture of opacified aerogel powders comprising:
 35% by weight of particles having a size of less than 100 μm, and
 65% by weight of particles having a size of between 1000 and 1250 μm,
has an apparent density ($\rho_{app}$) of 0.095 g/cm$^3$, a compactness of 0.76 and a thermal conductivity of 14.9 mW/(m·K) at 23° C.

A volume of this mixture is subsequently mixed with 0.20 volume of an aqueous preparation comprising 12.7% by weight of a styrene/butadiene latex dispersion diluted to 47% in water and sold under the Sikalatex® brand, comprising 4.3% by weight of a 30% aqueous dispersion of nonionic surfactant sold under the Flip-Flop® reference by PCAS.

The homogeneous composition obtained has the consistency of a paste, which is spread to a thickness of 1 cm in a mold, at the bottom of which has been placed a paper sheet impregnated with the aqueous preparation. A second impregnated sheet is used to cover the paste. This sandwiched structure is allowed to dry under a pressure of 0.9 kPa, at a temperature of 40° C. and at a relativity humidity of 10%, for 18 h. The paper sheets are withdrawn and a product is thus obtained in the form of a self-supporting plate which is easy to handle and to cut up.

Its conductivity is only 14.9 mW/(m·K) at 23° C. This value is spectacularly low in comparison with the thermal conductivities reported in the prior art for insulating products based on bonded aerogel particles devoid of phyllosilicates, of between 25 and 350 mW/(m·K).

EXAMPLE 4

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
40% by weight of particles having a size of less than 100 µm, and
60% by weight of particles having a size of between 1000 and 1250 µm,
has an apparent density ($\rho_{app}$) of 0.136 g/cm$^3$, a compactness of 0.80 and a thermal conductivity of 15.8 mW/(m·K) at 23° C.

A volume of this mixture is subsequently mixed with 0.225 volume of an aqueous preparation comprising 2.1% by weight of a cellulose ether, sold by Tylose® under the reference Tylose HA40YP2, and 1.3% by weight of nonionic surfactant, sold by Tylose® under the reference Tylovis EP28. The homogeneous composition obtained has the consistency of a paste, which is spread to a thickness of 1 cm in a perforated mold, at the bottom of which has been placed a paper sheet impregnated with the aqueous preparation. A second impregnated sheet is used to cover the paste. This sandwiched structure is allowed to dry, at a temperature of 40° C. and at a relatively humidity of 10%, for 18 hours. A product is thus obtained in the form of a self-supporting plate which is easy to handle and to cut up.

The conductivity of the layer comprising the aerogel is only 15.7 mW/(m·K) at 23° C. This value is spectacularly low in comparison with the thermal conductivities reported in the prior art for insulating products based on bonded aerogel particles devoid of phyllosilicates, of between 25 and 350 mW/(m·K).

EXAMPLE 5

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
40% by weight of particles having a size of less than 100 µm, and
60% by weight of particles having a size of between 1000 and 1250 µm,
has an apparent density ($\rho_{app}$) of 0.136 g/cm$^3$, a compactness of 0.80 and a thermal conductivity of 15.8 mW/(m·K) at 23° C.

A volume of this mixture is subsequently mixed with 0.24 volume of an aqueous preparation based on a two-component epoxide resin sold by BASF under the reference Mastertop 1720. This preparation comprises 4.9% by weight of the epoxide component Mastertop 1720 A7, 5.22% of the component Mastertop 1720 B7 and 3.95% by weight of a 30% aqueous dispersion of nonionic surfactant sold under the Flip-Flop® reference by PCAS. The epoxide components are intimately mixed in a first step before the water and the surfactant are added.

The homogeneous composition obtained has the consistency of a paste, which is spread to a thickness of 1 cm in a perforated mold, at the bottom of which has been placed a paper sheet impregnated with the aqueous preparation. A second impregnated sheet is used to cover the paste. This sandwiched structure is allowed to dry, at a temperature of 40° C. and at a relative humidity of 10%, for 18 hours. A product is thus obtained in the form of a self-supporting plate which is easy to handle and to cut up.

The conductivity of the layer comprising the aerogel is only 16.8 mW/(m·K) at 23° C. This value is spectacularly low in comparison with the thermal conductivities reported in the prior art for insulating products based on bonded aerogel particles devoid of phyllosilicates, of between 25 and 350 mW/(m·K).

EXAMPLE 6

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
30% by weight of particles having a size of less than 100 µm, and
70% by weight of particles having a size of between 1000 and 1250 µm,
has an apparent density ($\rho_{app}$) of 0.129 g/cm$^3$, a compactness of 0.78 and a thermal conductivity of 16 mW/(m·K) at 23° C.

For a volume of this mixture, mixing with the other components is carried out in two stages. The first stage is a mixing with 0.164 volume of an aqueous solution comprising 1.2% by weight of nonionic surfactant Triton X100 sold by Dow®. In the second stage, this combination is mixed with 0.246 volume of an aqueous preparation comprising 14.1% by weight of a dispersion of vinyl/acrylic copolymer, sold by Vinavil® under the reference M310 Emulsion, and 1.2% by weight of Triton X100.

The homogeneous composition obtained has the consistency of a paste, which is spread to a thickness of 1 cm in a perforated mold, at the bottom of which has been placed a paper sheet impregnated with the aqueous preparation. A second impregnated sheet is used to cover the paste. 0.05 volume of the liquid phase is subsequently extracted by compressing the paste within this mold. This sandwiched structure is allowed to dry, at a temperature of 40° C. and at a relative humidity of 10%, for 24 hours. A product is thus obtained in the form of a self-supporting plate which is easy to handle and to cut up.

The conductivity of the layer comprising the aerogel is only 17.7 mW/(m·K) at 23° C., that is to say scarcely greater than that of the powder mixture used for its preparation. This value is spectacularly low in comparison with the thermal conductivities reported in the prior art for insulating products based on bonded aerogel particles devoid of phyllosilicates, of between 25 and 350 mW/(m·K).

EXAMPLE 7

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
40% by weight of particles having a size of less than 100 µm, and
60% by weight of particles having a size of between 1000 and 1250 µm, has an apparent density ($\rho_{app}$) of 0.134 g/cm$^3$, a compactness of 0.80 and a thermal conductivity of 15.2 mW/(m·K) at 23° C.

In a first step, a volume of this mixture is mixed with 0.44% by weight of polyethylene (PET) fibers with a length of 6 mm. This new mixture is subsequently mixed with 0.21 volume of an aqueous preparation comprising 12% by weight of a dispersion of Model Dispersion latex from BASF diluted to 48% in water comprising 5.7% by weight of a 30% by weight aqueous dispersion of nonionic surfactant, sold under the Flip-Flop® reference by PCAS.

The Model Dispersion latex provided by BASF is a styrene/butyl acrylate (sometimes called polystyrene—poly (butyl acrylate)) with a particle size of 210 nm (diameter). It is composed of 44% styrene, 53% butyl acrylate and 3% acrylic acid. The methacrylic acid or PMAA is the steric stabilization system. It is grafted to the surface of the latex particles.

The homogeneous composition obtained has the consistency of a paste, which is spread to a thickness of 4 cm in a perforated mold, at the bottom of which has been placed a paper sheet impregnated with the aqueous preparation. A second impregnated sheet is used to cover the paste. 0.05 volume of the liquid phase is subsequently extracted by compressing the paste within this mold. This sandwiched structure is allowed to dry, at a temperature of 40° C. and at a relative humidity of 10%, for 24 hours. A product is thus obtained in the form of a self-supporting plate which is easy to handle and to cut up.

The conductivity of the layer comprising the aerogel is only 15.9 mW/(m·K) at 23° C., that is to say scarcely greater than that of the powder mixture used for its preparation. This value is spectacularly low in comparison with the thermal conductivity reported in the prior art for insulating products based on bonded aerogel particles devoid of phyllosilicates, of between 25 and 350 mW/(m·K).

EXAMPLE 8

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
40% by weight of particles having a size of less than 100 µm, and
60% by weight of particles having a size of between 1000 and 1250 µm, has an apparent density ($\rho_{app}$) of 0.133 g/cm$^3$, a compactness of 0.79 and a thermal conductivity of 16 mW/(m·K) at 23° C.

A volume of this mixture is subsequently mixed with 0.285 volume of an aqueous solution comprising 1.2% by weight of nonionic surfactant Triton X100, sold by Dow®, and 2.2% by weight of cellulose adhesive, sold under the Quelid Vinyl+® brand.

The homogeneous composition obtained has the consistency of a paste, which is spread to a thickness of 1 cm in a perforated mold, at the bottom of which has been placed a paper sheet impregnated with the aqueous preparation. A second impregnated sheet is used to cover the paste. 0.05 volume of the liquid phase is subsequently extracted by compressing the paste within this mold. This sandwiched structure is allowed to dry, at a temperature of 40° C. and at a relative humidity of 10%, for 24 hours. A product is thus obtained in the form of a self-supporting plate which is fairly easy to handle and to cut up.

The conductivity of the layer comprising the aerogel is only 17 mW/(m·K) at 23° C., that is to say scarcely greater than that of the powder mixture used for its preparation. This value is spectacularly low in comparison with the thermal conductivities reported in the prior art for insulating products based on bonded aerogel particles devoid of phyllosilicates, of between 25 and 350 mW/(m·K).

EXAMPLE 9

Not According to the Invention

Two hydrophobic silica aerogels, sold under the Isogel® name by PCAS/Enersens, with particle sizes, established by sieving, of between 0 and 100 µm for the first and of between 1000 and 1250 µm for the second, are mixed.

A mixture of aerogel powders comprising:
40% by weight of particles having a size of less than 100 µm, and
60% by weight of particles having a size of between 1000 and 1250 µm, is produced.

This mixture has an apparent density of 0.133 g/cm$^3$, a compactness of 0.79 and a thermal conductivity of 16 mW/(m·K) at 23° C.

A volume of this mixture is subsequently mixed with 0.27 volume of an aqueous preparation comprising 2.2% by weight of cellulose adhesive, sold under the Quelid Vinyl+® brand of Bostik.

The composition obtained is not very homogeneous. It has the consistency of a paste, which is spread to a thickness of 1 cm in a perforated mold, at the bottom of which has been placed a paper sheet impregnated with the wallpaper adhesive. A second impregnated sheet is used to cover the paste. This sandwiched structure is allowed to dry, at a temperature of 25° C. and at a relative humidity of 50%, for 6 days. A product is thus obtained in the form of a plate which easily breaks when handled.

Evaluation of the Mechanical Properties of the Materials According to with the Invention—Study of the Influence of the Binder:

The mechanical properties of materials according to the invention were evaluated and compared with those of materials not according with the invention. More specifically, "four-point" bending tests were carried out in order to determine the maximum strength of the material and the strain of the material at this maximum strength.

The bending test is adapted from the standard AFNOR XP-P 18409 for fiber-reinforced concretes.

Prism-shaped test specimens with dimensions of 20×20× 80 mm are stressed with a distance between lower supports of A=60 mm and a distance between upper supports of B=20 mm.

The test is carried out on a "Bose Electroforce EF3200" device and driven in an open loop with a 22 N cell and an LVDT displacement transducer.

A load/deflection curve is then obtained. This curve exhibits a single maximum which is subsequently used to calculate the maximum stress or strength and the strain at this peak.

The mechanical properties thus determined are shown in the table below. The presented results are the mean of 6 tests.

| Self-supporting plate | Surfactant | Organic polymer | Conductivity (mW/(m·K)) | Maximum strength (kPa) | Strain at MS (%) |
|---|---|---|---|---|---|
| According to example 1 | Flip-Flop ® | Quelid Vinyl+ ® cellulose adhesive | 17 | 50 | 3.2 |
| According to example 7 | Flip-Flop ® | Model Dispersion latex | 15.9 | 128 | 6.0 |
| According to example 8 | Triton ® | Quelid Vinyl+ ® cellulose adhesive | 17 | 12 | 2.3 |
| According to example 9 | without | Quelid Vinyl+ ® cellulose adhesive | 17 | 2 | 1 |

The above results show that the materials according to the invention, such as the materials according to examples 1, 7 and 8, constitute very good insulators and in addition exhibit noteworthy mechanical properties.

The invention claimed is:

1. A cohesive solid thermal insulation material consisting of:
   (a) 70% to 98% by volume of hydrophobic silica aerogel particles having an intrinsic density of between 110 and 210 kg/m$^3$,
   (b) 0.3% to 12% by volume of an organic binder formed by at least one organic polymer (b1) and at least one surfactant (b2), or by at least one amphiphilic organic polymer (b3),
   (c) at most 2% by volume of particles which are opacifying under infrared radiation, and
   (d) a volume fraction of air disposed in the interparticulate space of said cohesive solid thermal insulation material;
   these volume fractions being determined by image analysis on thin sections of the solid material and being with respect to the total volume of the material,
   the aerogel particles having a particle size distribution exhibiting at least two maxima, with a first maximum corresponding to an equivalent diameter (d) of less than 200 μm and a second maximum corresponding to an equivalent diameter (D) of between 400 μm and 10 mm
   wherein said cohesive solid thermal insulation material presents a thermal conductivity of less than 18 mW/(m·K).

2. The material as claimed in claim 1, wherein the ratio D/d is between 10 and 200.

3. The material as claimed in claim 1, wherein the volume fraction of aerogel particles having an equivalent diameter of less than 200 μm, with respect to the total aerogel fraction, is between 7.5% and 60%.

4. The material as claimed in claim 1, wherein the volume fraction of aerogel particles having an equivalent diameter of less than 150 μm, with respect to the total aerogel fraction, is between 7.5% and 60%.

5. The material as claimed in claim 1, wherein the volume fraction of aerogel particles having an equivalent diameter of less than 80 μm, with respect to the total aerogel fraction, is between 7.5% and 60%.

6. The material as claimed in claim 1, wherein the organic polymer (b1) or the amphiphilic organic polymer (b3) is a thermoplastic organic polymer.

7. The material as claimed in claim 1, wherein the organic polymer (b1) or the amphiphilic polymer (b3) is a thixotropic polymer.

8. The material as claimed in claim 1, wherein the organic polymer (b1) is a thermoset organic resin.

9. The material as claimed in claim 1 exhibiting a density, in the dry state, of between 100 and 215 kg/m$^3$.

10. A process for the preparation of a solid thermal insulation material as claimed claim 1, comprising:
    mixing the hydrophobic silica aerogel particles (a) having a particle size distribution exhibiting at least two maxima, with a first maximum corresponding to an equivalent diameter (d) of less than 200 μm and a second maximum corresponding to an equivalent diameter (D) of between 400 μm and 10 mm the surfactant (b2) and the organic polymer (b1) or the amphiphilic polymer (b3) with, or bringing them into contact with, 0.75 to 4 parts by weight of water,
    shaping the aqueous composition thus obtained, and
    drying the shaped material.

11. The process as claimed in claim 10 wherein the hydrophobic silica aerogel (a), before mixing or bringing into contact with the other ingredients, has a compactness of greater than 0.75.

12. The process as claimed in claim 10, wherein the weight ratio of the organic polymer (b1) to the surfactant (b2) is between 30/70 and 80/20.

13. The process as claimed in claim 10, wherein the organic polymer (b1) and the surfactant (b2) or the amphiphilic organic polymer (b3) are first dissolved or dispersed in the water, the solution or dispersion subsequently being mixed or brought into contact with the aerogel particles.

14. The process as claimed in claim 10, wherein the hydrophobic silica aerogel (a) is obtained by mixing at least two aerogel fractions, a first fraction exhibiting a mean equivalent diameter ($d_m$) of less than 200 μm and a second fraction exhibiting a mean equivalent diameter ($D_m$) of between 400 μm and 10 mm.

15. A thermal insulation product comprising at least one layer of a material as claimed in claim 1.

* * * * *